United States Patent
Cuijpers et al.

(10) Patent No.: US 6,947,062 B2
(45) Date of Patent: Sep. 20, 2005

(54) SEAMLESSLY COMBINED FREELY MOVING CURSOR AND JUMPING HIGHLIGHTS NAVIGATION

(75) Inventors: Maurice Cuijpers, San Jose, CA (US); Jan Van Ee, Cupertino, CA (US); Roel Foppema, Menlo Park, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 596 days.

(21) Appl. No.: 09/912,123

(22) Filed: Jul. 23, 2001

(65) Prior Publication Data

US 2003/0016249 A1 Jan. 23, 2003

(51) Int. Cl.⁷ .............................. G06F 3/00; G06F 3/033
(52) U.S. Cl. ........................ 345/767; 345/856; 345/159; 345/160; 348/734
(58) Field of Search .................. 345/767, 856, 345/159, 160, 158, 167, 157, 822, 821, 823, 831, 810, 835, 858–861, 863, 716, 717, 719, 720, 721; 348/734; 725/37, 52, 38, 59, 100, 153, 40, 43, 51, 56

(56) References Cited

U.S. PATENT DOCUMENTS

| | | |
|---|---|---|
| 4,719,455 A | 1/1988 | Louis |
| 5,184,120 A | 2/1993 | Schultz .................. 340/870.38 |
| 5,510,811 A * | 4/1996 | Tobey et al. ................. 345/157 |
| 5,539,478 A | 7/1996 | Betram et al. .............. 348/734 |
| 5,596,699 A | 1/1997 | Driskell ....................... 395/352 |
| 5,724,106 A | 3/1998 | Autry et al. ................ 348/734 |
| 5,760,763 A * | 6/1998 | Ainsburg .................... 345/157 |
| 5,790,820 A | 8/1998 | Vayda et al. ................ 395/352 |
| 5,798,760 A | 8/1998 | Vayda et al. ................ 345/352 |
| 5,900,867 A | 5/1999 | Schindler et al. ........... 345/327 |
| 5,910,798 A | 6/1999 | Sim |
| 5,995,155 A | 11/1999 | Schindler et al. ........... 348/461 |
| 6,069,614 A | 5/2000 | Singhal |
| 6,075,575 A * | 6/2000 | Schein et al. ............... 348/734 |
| 6,452,587 B1 * | 9/2002 | Nikom ....................... 345/167 |
| 6,614,455 B1 | 9/2003 | Cuijpers et al. ........... 345/810 |
| 6,664,989 B1 * | 12/2003 | Snyder et al. .............. 345/856 |

FOREIGN PATENT DOCUMENTS

| | | | |
|---|---|---|---|
| EP | 0355458 | 2/1990 | .......... G06F/3/033 |
| GB | 2 357 945 | 6/1999 | |

OTHER PUBLICATIONS

US S/N 09/426,518 filed Oct. 26, 1999 for Maurice Cuijpers et al., for Directional Navigation Within A Graphical User Interface.

* cited by examiner

*Primary Examiner*—Raymond J. Bayerl
(74) *Attorney, Agent, or Firm*—Edward W. Goodman

(57) ABSTRACT

A remote control, operating an on-screen set-top box (STB) menu, has a force sensitive resistor (FSR) for coarse or free navigation and a keypad, placed around the FSR, for fine navigation. A user gets feedback by a highlighted item or an on-screen cursor when operating the FSR and by the highlighted item for close-by navigation. Pushing down on the FSR, which also doubles as an OK- or select-key, results in the selection of highlighted option.

16 Claims, 3 Drawing Sheets

SEAMLESSLY COMBINED FREELY MOVING CURSOR AND JUMPING HIGHLIGHTS NAVIGATION

BACKGROUND OF THE INVENTION

1. Field of the Invention

The invention relates to a data processing system with a user interface, in particular, with a graphical user interface (GUI) and a remote control device (RC) within a living room or a consumer electronics (CE) environment. The system enables a consumer to navigate among user-interactive items (such as, commands or hyperlinks) and select a specific one with a highlight on a television display monitor (TV) as part of the GUI.

2. Description of the Related Art

Interactive television (ITV) enables two-way communication using a television display monitor as a GUI. ITV typically relates to entertainment, information retrieval, and electronic shopping. An example of an ITV is a Web-TV interactive set-top box (STB). In a living room environment with an interactive television (ITV), it is not easy for a user to navigate between user-selectable options in a GUI menu. This is, in part, due to the vast amount of data and the large number of user-selectable options that are offered to a user in the GUI menu. A computer mouse, as an input device, is typically not useful for navigation in the living room environment.

For example, in case of a Web-TV STB, the RC has four directional navigation keys for navigation (up, down, left, right), and an OK-button for selection. The option that is currently selectable is shown highlighted. The user can move the highlight to another selectable option by using the navigation keys. This can be a long and tedious process when many available options are scattered over the display screen, as they are likely to distract and irritate the user. Moreover, it takes a substantial amount of time and many navigation clicks for the user to get an option highlighted that is located at the other end of the screen when many options are displayed in between.

The problem is becoming more apparent with the introduction of more CE devices that enable user interaction with an increased number of selectable options. Since the user typically has a preference for a minimum number of navigation clicks (i.e., the lower the number of menu levels to go through, the better), this problem becomes even more apparent. Moreover, the user expects to be able to control the interactive environment at any time, e.g., when sitting in a relaxed position on a couch in front of the TV monitor.

SUMMARY OF THE INVENTION

The invention relates to a system for a user interface, in particular, to a GUI within a living room environment, in which solutions are offered for dealing with an increased number of user-selectable options, while keeping it easy and fun for the user to control the options. The system provides, in particular, a solution for navigation to and the selection of a highlight, such as, a command or hyperlink, as part of a GUI using a television screen (TV) as the display.

The emerging number of interactive applications is making navigation through user-selectable options a challenge. In personal computer (PC) applications, an important navigation tool for navigating to a desired option in an on-screen-display (OSD), is a mouse that controls an on-screen, freely moving cursor. When the cursor is moved to the option selected by the user, mainly using the mouse for coarse and fine positioning, the user can select the option by a mouse-click. The option closest to the current mouse position can be shown as highlighted. A trained user can navigate to a desired option in one arm swing and can make a selection shortly after.

In a non-PC home environment, a mouse is typically not the most convenient navigation tool. The invention describes a system that provides a solution for the home environment. It is therefore an object of the invention, among other things, to provide a solution that is intuitive and ergonomic to the user and is considered a natural extension to his/hers current user interface experience.

A widely used and relative cheap tool is a remote control (RC). The invention provides, for example, a highlighting that can be moved from one option to another as a means to navigate to a desired option. Many RC's have four or more navigation keys that enable the user to jump from one option to a desired option. Typically, an OK-button or select-button is available to select and activate the highlight.

The subject invention adds a coarse positioning user input device. An input device that is expected to perform well for the user is, e.g., a joystick such as a Force Sensitive Resistor (FSR) stick or FSR button. FSR's are well-known elements, typically employed as strain gauges. By grouping the navigation keys around the FSR component, an ergonomic navigation solution is created.

It is another object of the invention to provide a relatively inexpensive solution. This can be achieved, e.g., by combining the navigation keys within the FSR device. For example, a combination implementation is achieved by discriminating between contact time intervals. Contact time discrimination can be achieved within the RC but can also be implemented external to the RC, e.g., in a consumer STB. A short FSR contact period can be interpreted by the system as a fine positioning command and a longer or continuous contact period as a coarse positioning command.

The user can now quickly navigate to the desired option by using the FSR that can be operated by, e.g., his/her thumb. If needed, the navigation keys can be used for local fine navigation. The OK—or select-button can be used to select the option. The FSR can be constructed in such a way that, when depressed, it also acts as the select button.

Instead of an FSR, other coarse positioning input devices can be used. Examples are a touch-pad, a tracker ball and gravity/gyro-based devices. The FSR can come in various sizes and shapes. An example of an ergonomic input device is one that can be held with one hand whereby the navigation to the desired option and its selection can be done with one's thumb. Therefore, the subject invention provides an RC with navigation keys and a FSR that can be depressed to double as OK-key for option selection. The form factor is such that the RC is easily controllable within the range of one's thumb when holding the RC.

Position indication for coarse navigation can be visualized by using, e.g., a moving highlight or by a freely moving cursor, or a combination of thereof. Further information about a method to calculate which options should be highlighted when using the moving highlight may be found in, e.g., U.S. patent application Ser. No. 09/426,518, filed Oct. 26, 1999, forDIRECTIONAL NAVIGATION WITHIN A GRAPHICAL USER INTERFACE, now U.S. Pat. No. 6,614,455, incorporated herein by reference in its entirety.

In a preferred embodiment, a freely moving cursor for coarse navigation and a jumping highlight for fine navigation to visualize the navigation position is described. Upon stopping using the coarse control input device, an option closest to the cursor position will be highlighted and the cursor disappears. The cursor preferably fades out gradually a predetermined time after the user has stopped using the coarse control input. When the user wants to use the coarse device again at a later stage, the GUI designer can, e.g., let the cursor re-appear at the position of the highlighted option of that moment. By doing so, the invention provides a manner of seamlessly combining a freely moving cursor and a jumping highlight that are both used for the navigation method. It should be noted that even though a freely moving cursor is used for coarse navigation, a jumping highlight can be visible simultaneously. In another embodiment, only a jumping highlight is used to visualize the navigation position for both coarse and fine navigation.

It is yet another object of the invention to provide a GUI designer more design freedom. Re-use of a GUI that was originally designed and formatted for a PC environment, which is sometimes the case of Web-TV content, is now possible.

It is noted that the RC described can also be used for a non-visual coarse and fine navigation method. For instance, the navigation feedback can be realized by using an audible signal. For example, the coarse navigation position feedback can be achieved by producing a sound of a certain frequency and the fine position feedback by voicing the name of a current highlight.

The invention provides that current interactive CE-devices, such as, but not limited to, a Web-TV STB, can be upgraded to the teachings of the invention. In practice, this can be achieved by providing the user with an RC according to the invention, and by installing, or having installed, a software (SW) upgrade at the CE-device that embeds the GUI and the GUI-behavior in accordance with the invention. The invention also provides that instead of downloading improved SW to the CE-device, a remote service can be responsible for generating the GUI and the GUI-behavior, in accordance with the invention. In other words, the SW application is run at a server external to the home equipment.

BRIEF DESCRIPTION OF THE DRAWINGS

The invention is explained in further detail below, by way of example, and with reference to the accompanying drawings, in which.

DETAILED DESCRIPTIONS OF THE EMBODIMENTS

Figure 1:
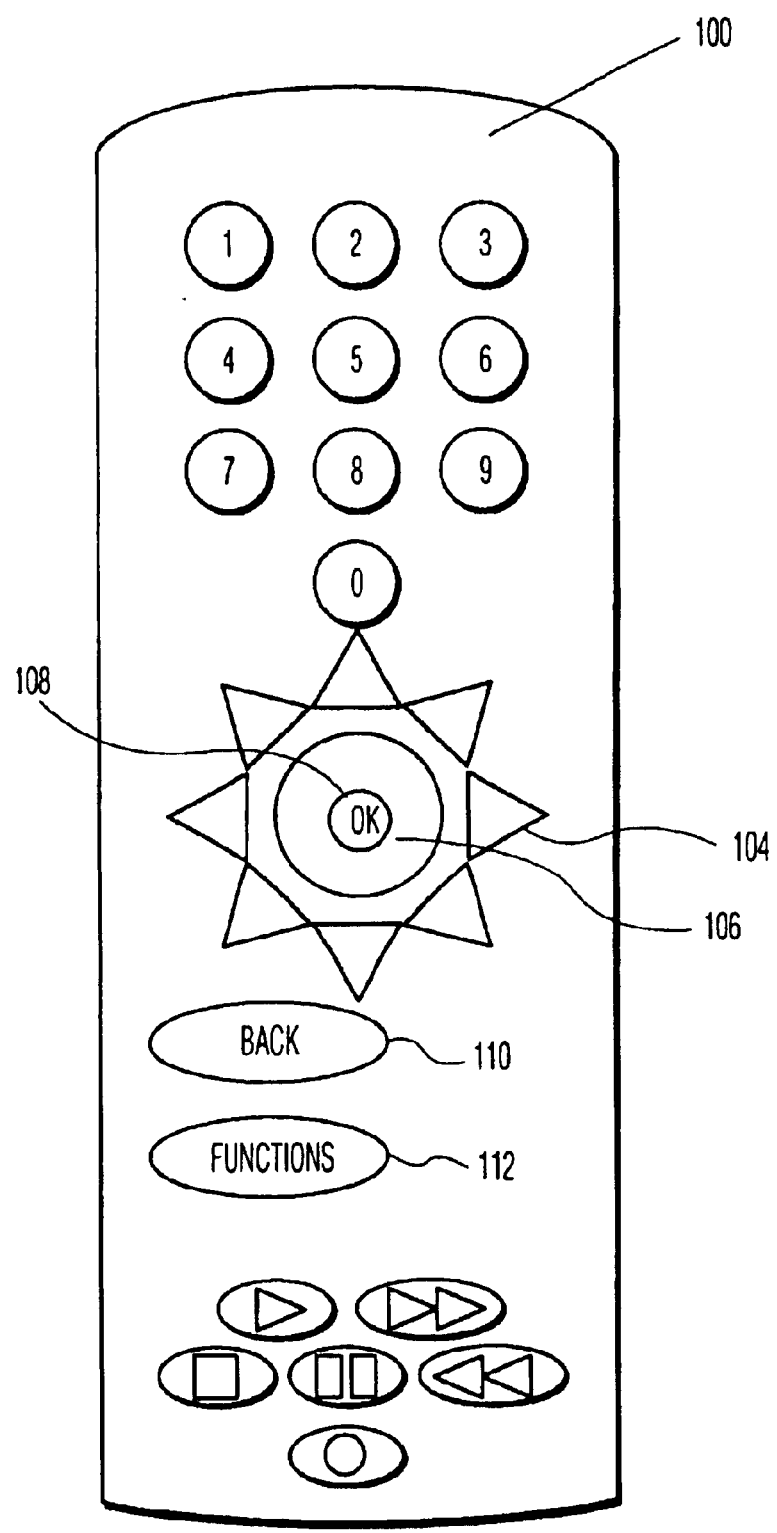
FIG. 1 is a diagram of an RC, which can be used as a user input device according to this invention.

FIG. 1 is a diagram illustrating an RC 100, which can be used as a user input device according to this invention. RC 100 comprises an 8-way navigation keypad 104 for fine navigation, an FSR 106 for coarse navigation, and an OK button 108 for selection of a desired option. RC 100 also comprises a back key 110 and a function key 112. An inexpensive RC version only uses a 4-way navigation keypad 104 (with left, right, up and down keys). FSR 106 comprises a navigation button. The firmer the user pushes the button in a certain direction in the plane of the button, the quicker the coarse navigation occurs. In a preferred embodiment, the OK button 108 is functionally a part of the FSR navigation button 106. Upon depressing button 106, the user activates the OK function. This is achieved, for example, by mounting FSR button 106 on a clickable element that can be moved perpendicularly to the plane of button 106 and that has two stable positions. One position is assumed when there is no vertical force applied to the element, the other one is assumed when a vertical force of a magnitude above a certain threshold is applied. In this manner, the user experiences a tactile feedback when actually selecting an option through the OK function. Of course, other implementations are possible. Preferably, the coarse positioning means 106 is positioned between the OK button 108 and the keypad 104 for fine navigation. In order for the user to operate the keys of keypad 104 for fine navigation in an ergonomic and convenient manner, these keys are to be positioned at a certain minimum distance from each other. They are not to be positioned at a too large distance from each other either, so as to enable the user to operate them with his/her thumb. Accuracy is not so much of an issue with respect to the coarse navigation. Accordingly, it is preferred that in the lay-out of the buttons and keys, the coarse navigation user input means 106 lies within an area enclosed by the keys of keypad 104 for fine navigation. Back key 110 can be used to quickly get back to the previous navigation position. Functions key 112 can, e.g., navigate the user to a different set of options or to a higher-level functions menu. Keypad 104, FSR 106 and OK button 108 can be molded integrally as one part, making its usage more intuitive and ergonomically acceptable to the user.

As noted earlier, the RC can be made less expensive by using contact time discrimination detection. That is, contact time is measured to discriminate between coarse and fine navigation. For example, if the user uninterruptedly presses a navigation input for a longer time period, the system interprets this as the coarse positioning mode, and sweeps the highlight fast across the screen. If the user taps the navigation input slightly, the system interprets this as a fine positioning mode and lets the highlight jump, accordingly, only one step. By, e.g., shortly tapping one's finger on the top ("North") part of FSR 106, the user achieves an upwards moving highlight. In that case, keypad 104 may not need individual physical keys, but rather, is implemented as an integral part of FSR 106. This not only makes the RC less costly, it also makes the RC smaller.

Figure 2:
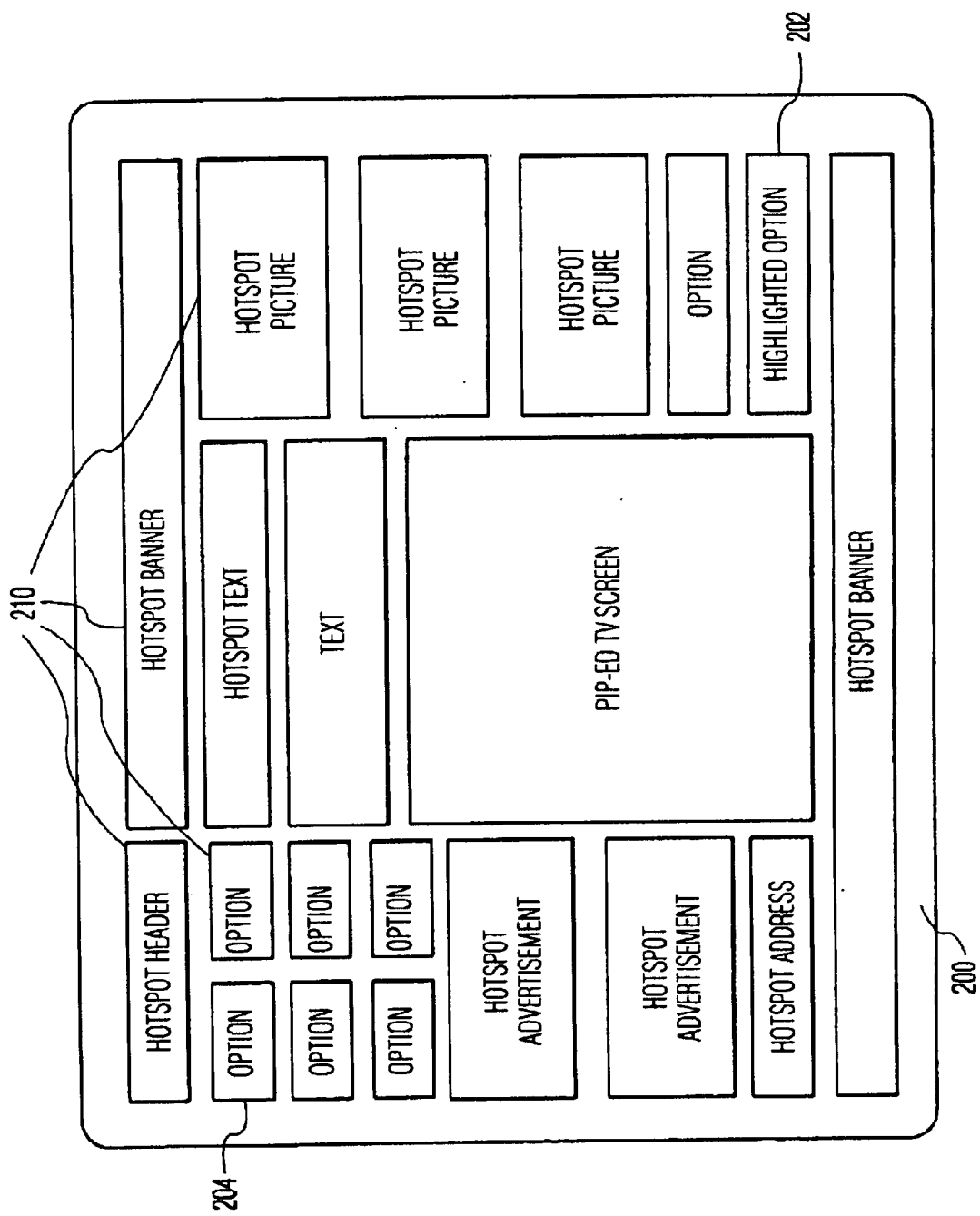
FIG. 2 is a diagram illustrating a GUI screenshot that shows a beginning of a user navigation action.

FIG. 2 is a diagram illustrating a GUI screenshot 200 that shows a beginning of a user navigation action. Screenshot 200 comprises a highlighted option 202, a desired option 204 and some other hotspots and options, e.g., options 210. A hotspot, in this context, means an Internet hyperlink, a control command, etc. As can be seen from screenshot 200, it will take the user quite a number of keypad 104 presses to get from option 202 to the desired option 204. Moreover, this can be achieved in numerous combinations of keypad 104 key-presses. Using only key-presses, the user actually has to decide on a strategy of how to get to the desired option in the quickest and/or easiest way. The user may very well consider this as an annoying and unpleasant action. If the user chooses to do so, he or she can still navigate by only using keypad 104 key-presses and OK-button 108 for activation or execution of the desired option 204.

Figure 3:
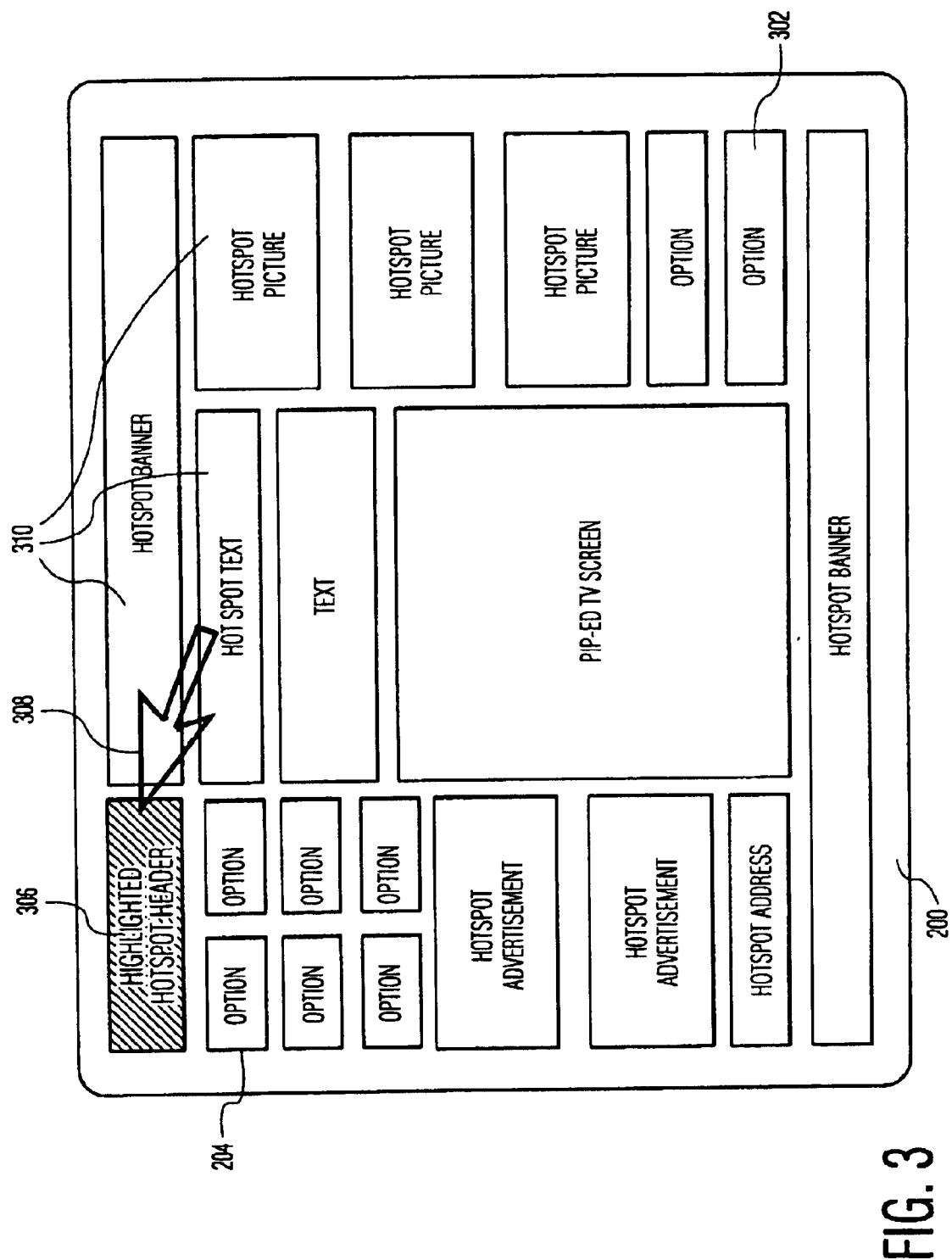
FIG. 3 is a diagram illustrating a GUI screenshot that shows one of the final steps of a user navigation action.

FIG. 3 is a diagram illustrating another view of GUI screenshot 200 that shows some progress in the user navigation action. Screenshot 200 comprises the, previously highlighted, option 302, a newly highlighted option 306, a freely moving cursor 308, the desired option 204 and other hotspots and options 310. Cursor 308, which appears on the screen after the user uses the FSR 106, has traveled in a continuous path from option 302 to option 306, corresponding to the direction of a force the user has been applying to the FSR 106. In the preferred embodiment, the cursor 308 disappears from the screen once the user stops applying a force to the FSR 106. A hotspot or option closest to the position of the cursor at that moment will then be highlighted, in this case, option 306. The close proximity of desired option 204 from highlighted option 306 should be noted. It will take the user little effort to navigate from option 306 to desired option 204 by using keypad 104. The user only needs to depress the left-down key of keypad 104 in order to let the highlight jump from option 306 to desired option 204. By subsequently pressing OK-button 108 the user activates or executes the desired option 204.

What is claimed is:

1. A consumer electronics system comprising:
   a user feedback device for rendering user-selectable options; and
   a user input device for selection of a specific one of a plurality of options rendered, the user input device comprising:
   coarse positioning user input means for enabling a user to navigate towards a neighborhood of the specific option in a coarse positioning mode; and
   fine positioning user input means for enabling the user to navigate within the neighborhood of the specific option in a fine positioning mode,
   wherein the fine positioning user input means is placed around the coarse positioning user input means in such a way that the fine positioning user input means and the coarse positioning user input means are controllable be a user's thumb.

2. The consumer electronics system as claimed in claim 1, wherein the fine positioning user input means comprises four or more directional input keys.

3. The consumer electronics system as claimed in claim 1, wherein the coarse input means is physically combined with an option selection means for selecting the specific option.

4. The consumer electronics system as claimed in claim 1, wherein the coarse input means comprises at least of one of the following: a touch-pad; an FSR button; a trackerball.

5. The consumer electronics system as claimed in claim 1, wherein the user feedback device comprises a GUI having:
   an on-screen cursor for providing visual feedback to a user of a current navigation position when using the coarse positioning user input means; and
   a highlighted option for providing visual feedback to the user of the current navigation position when using the fine positioning user input means.

6. The consumer electronics system as claimed in claims 5, wherein the coarse positioning input means is physically combined with an option selection means for selection of the highlighted option.

7. A consumer electronics system comprising:
   a user feedback device for rendering user-selectable options; and
   a user input device for selection of a specific one of a plurality of options rendered, the user input device comprising:
   coarse positioning user input means for enabling a user to navigate towards a neighborhood of the specific option in a coarse positioning mode; and
   fine positioning user input means for enabling the user to navigate within the neighborhood of the specific option in a fine positioning mode,
   wherein the fine positioning user input means comprises four or more directional inputs keys,
   wherein the coarse positioning input and the fine positioning input means are physically combined into one device,
   and wherein the device uses contact time discrimination in order to be able to distinguish between a coarse navigation input mode and a fine navigation input mode.

8. A software application stored in a memory of a processor for enabling a user to interact with a consumer electronics system under feedback of a rendering of user selectable options,
   the software application comprising:
   causing said processor to input data representative of a user input associated with user navigation among the user selectable options; and
   causing said processor to output data representative of a current navigation position relative to the user selectable options rendered;
   said software application controlling said processor to have a coarse positioning mode to enabling coarse navigation towards a neighborhood of a specific one of the user selectable options, and
   a fine positioning mode enabling navigation within the neighborhood of the specific one of the user selectable options,
   wherein operation in the coarse positioning mode or in the fine positioning mode is determined by discrimination between respective time intervals representative of respective temporal patterns of the data at the input.

9. The software application as claimed in claim 8, wherein the input data in the fine positioning mode is representative of a signal from a fine positioning user input means that comprises four or more directional input keys.

10. The software application as claimed in claim 8, for rendering a GUI, and for enabling generation of an on-screen cursor for visual feedback to a user of a current navigation position in the coarse positioning mode, and a jumping highlight for visual feedback to the user of the current navigation position in the fine positioning mode.

11. A method of enabling a user to navigate among user-selectable options rendered on a display monitor, the method comprising the steps:
   enabling the user to provide coarse input data for navigation towards a neighborhood of a specific one of the options in a coarse navigation mode;
   enabling the user to provide fine input data for navigation within the neighborhood of the specific option in a fine navigation mode; and
   providing, on the display monitor, a first indicia representative of a current position while navigating in the fine navigation mode and a second indicia representative of the current position while navigating in the coarse navigation mode,
   wherein the method is usable for an input device having combined coarse and the fine input means, whereby contact time discrimination detection is applied for distinguishing between the user's coarse and fine navigation input.

12. The method as claimed in claim 11, wherein the method accepts input data from the fine positioning user input means that comprises four or more directional input keys.

13. The method as claimed in claim 11, for use with a GUI and wherein the first indicia comprises an on-screen cursor and the second indicia comprises a highlight.

14. A remote controller for control of an indicia rendered on a display monitor for navigating in a menu of user selectable options rendered on the display monitor, wherein the controller comprises:

coarse positioning user input means for enabling a user to navigate towards a neighborhood of the specific option in a coarse positioning mode; and fine positioning user input means for enabling the user to navigate within the neighborhood of the specific option in a fine positioning mode, wherein the coarse positioning user input means and the fine positioning user input means are positioned on the controller for being conveniently operated by a user's thumb, wherein the coarse and the fine positioning user input means are physically integrated with each other in a component, and wherein the controller comprises a sensor for measuring contact time of the user uninterruptedly operating the component to distinguish between the coarse positioning mode and the fine positioning mode.

15. A remote controller for control of an indicia rendered on a display monitor for navigating in a menu of user selectable options rendered on the display monitor, wherein the controller comprises:

coarse positioning user input means for enabling a user to navigate towards a neighborhood of the specific option in a coarse positioning mode; and fine positioning user input means for enabling the user to navigate within the neighborhood of the specific option in a fine positioning mode, wherein the coarse positioning user input means and the fine positioning user input means are positioned on the controller for being conveniently operated by a user's thumb, wherein the controller further comprises option selection user input means for enabling the user to select a specific option associated with a current position of the indicia, and wherein the coarse positioning user input means is spatially located between the fine positioning user input means and the option selection user input means.

16. A remote controller for control of an indicia rendered on a display monitor for navigating in a menu of user selectable options rendered on the display monitor, wherein the controller comprises:

coarse positioning user input means for enabling a user to navigate towards a neighborhood of the specific option in a coarse positioning mode; and fine positioning user input means for enabling the user to navigate within the neighborhood of the specific option in a fine positioning mode, wherein the coarse positioning user input means and the fine positioning user input means are positioned on the controller for being conveniently operated be a user's thumb, and wherein the fine position user input means is centered around the coarse position user input means.

* * * * *